(12) United States Patent
Hsu et al.

(10) Patent No.: US 8,503,170 B1
(45) Date of Patent: Aug. 6, 2013

(54) WATERPROOF AND SHOCKPROOF COVER FOR A PAD COMPUTER

(75) Inventors: Min-Chieh Hsu, Taipei (TW); Ding-Yu Lin, Taipei (TW); Hsin-Chang Chen, Taipei (TW)

(73) Assignee: First International Computer, Inc., Taipei (TW)

( * ) Notice: Subject to any disclaimer, the term of this patent is extended or adjusted under 35 U.S.C. 154(b) by 12 days.

(21) Appl. No.: 13/410,060

(22) Filed: Mar. 1, 2012

(51) Int. Cl.
  *H05K 5/00* (2006.01)
  *H05K 7/00* (2006.01)
  *G06F 1/16* (2006.01)
  *B65D 85/00* (2006.01)

(52) U.S. Cl.
  USPC .............. 361/679.02; 361/679.01; 361/679.3; 361/679.55; 361/679.56; 206/320; 206/701

(58) Field of Classification Search
  USPC .............. 361/679.01, 679.02, 679.3, 679.55, 361/679.56; 206/320, 701, 521, 527
  See application file for complete search history.

(56) References Cited

U.S. PATENT DOCUMENTS

| | | | | |
|---|---|---|---|---|
| 5,583,742 A * | 12/1996 | Noda et al. | ............... | 361/679.21 |
| 6,532,152 B1 * | 3/2003 | White et al. | .................. | 361/692 |
| 7,907,394 B2 * | 3/2011 | Richardson et al. | ........ | 361/679.3 |
| 2006/0104021 A1 * | 5/2006 | Chen et al. | ...................... | 361/683 |
| 2009/0009945 A1 * | 1/2009 | Johnson et al. | ............... | 361/681 |
| 2009/0034169 A1 * | 2/2009 | Richardson et al. | ..... | 361/679.01 |
| 2012/0314354 A1 * | 12/2012 | Rayner | .................... | 361/679.01 |
| 2013/0027862 A1 * | 1/2013 | Rayner | ...................... | 361/679.3 |

FOREIGN PATENT DOCUMENTS

TW M388025 U1 9/2010

* cited by examiner

*Primary Examiner* — Anthony Haughton
(74) *Attorney, Agent, or Firm* — Muncy, Geissler, Olds & Lowe, PLLC

(57) ABSTRACT

A waterproof and shockproof cover for a PAD computer is disclosed. The cover comprises an upper housing, a base housing, a glass, a first rubber ring, a second rubber ring and four shockproof elements. The base housing is corresponding to the upper housing, wherein the upper housing comprises a first connection and the base housing comprises a second connection corresponding to the first connection for fastening with each other. The upper housing comprises a viewing window hole and a first groove formed around the rim of the viewing hole, and the first rubber ring is disposed within the first groove. The glass covers the viewing window hole and the first rubber ring. The four shockproof elements disposed respectively at four corners of a rectangular accommodation space of the base housing for bearing the PAD computer.

7 Claims, 5 Drawing Sheets

WATERPROOF AND SHOCKPROOF COVER FOR A PAD COMPUTER

BACKGROUND OF THE INVENTION

1. Field of the Invention

The present invention relates to a cover; more particularly, the present invention relates to a waterproof and shockproof used cover for a pad.

2. Description of the Related Art iPAD™ is developed by Apple Inc.® and causes people swarming to have it. It also causes some followers to develop same or similar products, called "PAD".

Some waterproof products are developed for PAD. However, the waterproof products are bags, which can't provide shockproof function.

A waterproof and shockproof device for PAD is disclosed in TW099205813. However, it requires different design for the housing of the PAD. In other words, TW099205813 discloses a PAD with waterproof and shockproof housing.

Therefore, there is a need to provide a waterproof and shockproof cover for a pad, which can provide users an additional option for their PAD products.

SUMMARY OF THE INVENTION

It is an object of the present invention to provide a cover used for a pad.

It is another object of the present invention to provide a waterproof and shockproof cover used for a pad.

To achieve the aforementioned objects, a waterproof and shockproof cover for a PAD computer is provided. The cover comprises an upper housing, a base housing, a glass, a first rubber ring, a second rubber ring and four shockproof elements.

The base housing is corresponding to the upper housing, wherein the upper housing comprises a first connection and the base housing comprises a second connection corresponding to the first connection for fastening with each other.

The upper housing comprises a viewing window hole and a first groove, and the first rubber ring is disposed within the first groove.

The glass covers the viewing window hole and the first rubber ring. The base housing comprises a rectangular accommodation space having four corners. The four shockproof elements are disposed respectively at the four corners of the rectangular accommodation space of the base housing for bearing the PAD computer.

The base housing comprises a base groove for receiving the second rubber ring. In a preferred embodiment, the upper housing comprises a second groove located corresponding to the base groove, and the second rubber ring is received into both the base groove and the second groove when the upper housing and the base housing are fastening with each other.

In one embodiment, the four shockproof elements are four rubber balls, and each rubber ball is formed with a hole for receiving a corner of the PAD computer. In another embodiment, each shockproof element is formed with at least two rubber pads.

Other objects, advantages, and novel features of the invention will become more apparent from the following detailed description when taken in conjunction with the accompanying drawings.

DETAILED DESCRIPTION OF THE PREFERRED EMBODIMENT

These and other objects and advantages of the present invention will become apparent from the following description of the accompanying drawings, which disclose several embodiments of the present invention. It is to be understood that the drawings are to be used for purposes of illustration only, and not as a definition of the invention.

Figure 1:
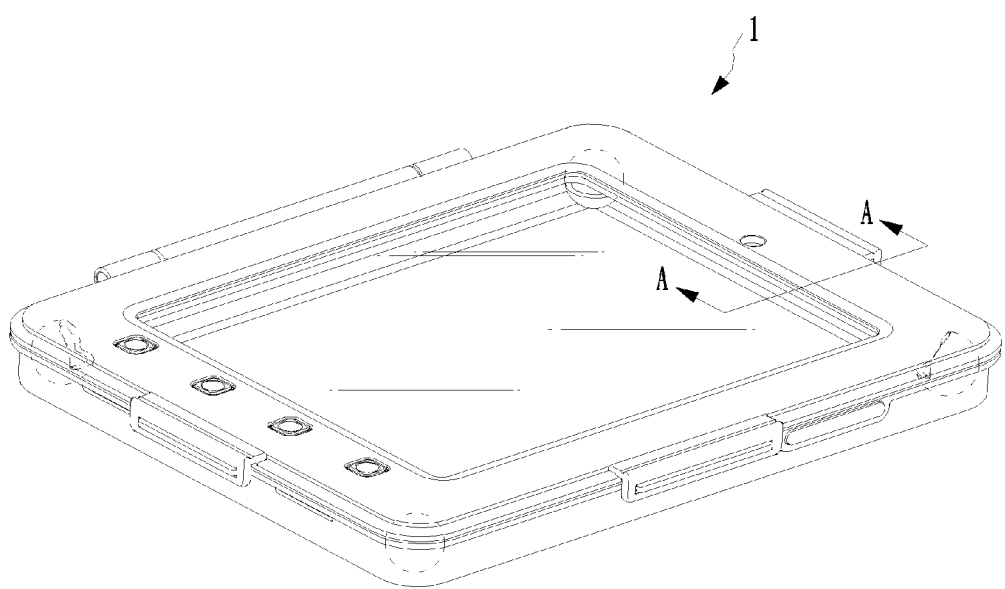
FIG. 1 is an illustration of a waterproof and shockproof cover for a PAD computer according to the present invention.
Figure 2:
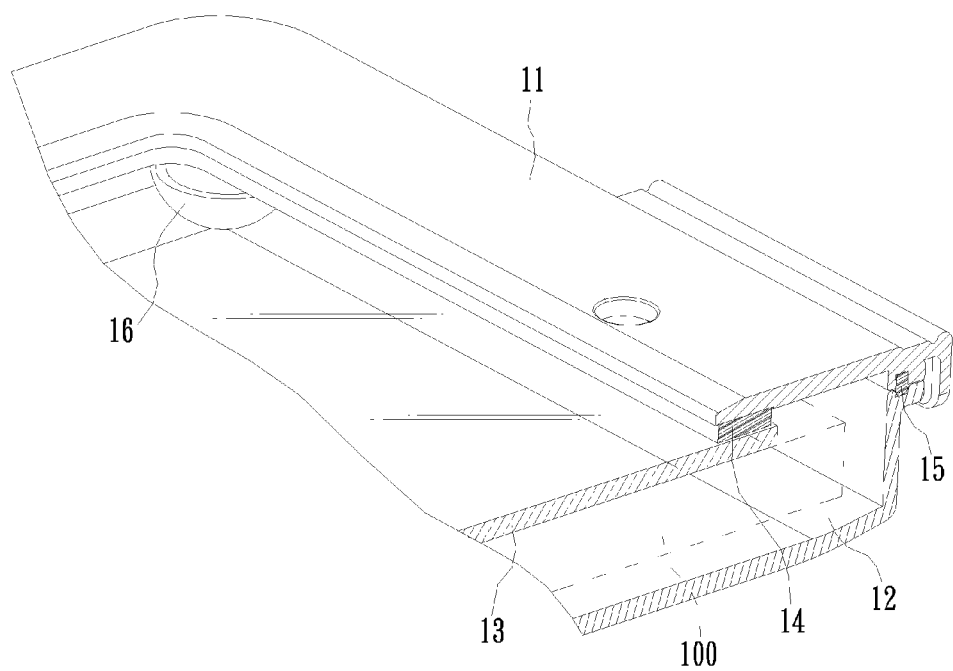
FIG. 2 is a partial sectional view according to A-A section of FIG. 1.
Figure 3:
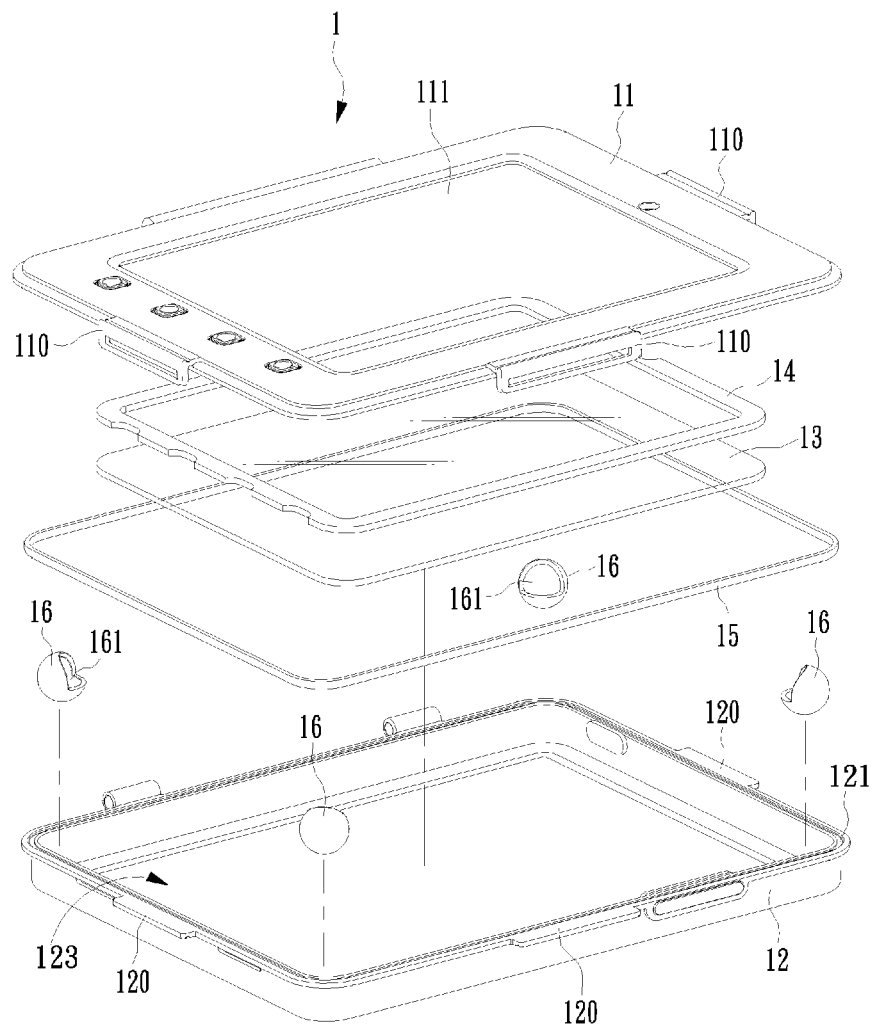
FIG. 3 is an exploded view of the waterproof and shockproof cover according to FIG. 1.

Referring to FIG. 1, FIG. 2, and FIG. 3, a waterproof and shockproof cover 1 for a PAD computer 100 is provided. FIG. 2 is a partial sectional view according to A-A section of FIG. 1. FIG. 3 is an exploded view of the waterproof and shockproof cover 1 according to FIG. 1. The cover 1 comprises an upper housing 11, a base housing 12, a glass 13, a first rubber ring 14, a second rubber ring 15 and four shockproof elements 16.

The base housing 12 is corresponding to the upper housing 11, wherein the upper housing 11 comprises a first connection 110 and the base housing 12 comprises a second connection 120 corresponding to the first connection 110 for fastening with each other. The first connection 110 and the second connection 120 can be varied according different design, which may be similar to the prior art. Thus, the first connection 110 and the second connection 120 can be traditional lockers or the like that can fasten the upper housing 11 and the base housing 12.

Figure 5:
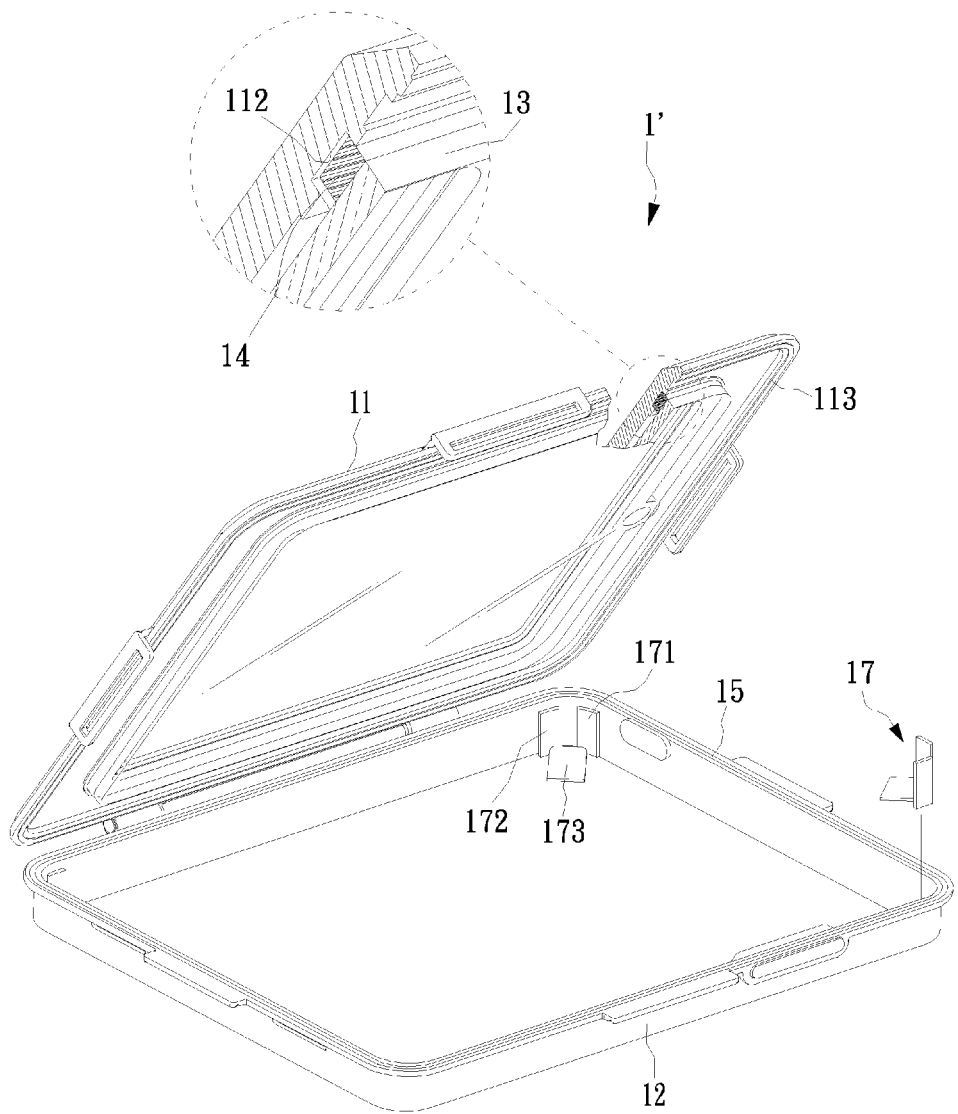
FIG. 5 is another embodiment of the waterproof and shockproof cover according to the present invention.

The upper housing 11 comprises a viewing window hole 111 and a first groove 112 (shown in FIG. 5). The first groove 112 is formed around the rim of the viewing window hole 111. The first rubber ring 14 is disposed within the first groove 112. The first rubber ring 14 can further provide a shockproof function. The glass 13 covers the viewing window hole 111 and the first rubber ring 14.

The base housing 12 comprises a base groove 121 for receiving the second rubber ring 15. The base housing 12 comprises a rectangular accommodation space 123 having four corners. The four shockproof elements 16 are disposed respectively at the four corners of the rectangular accommodation space 123 of the base housing 12 for bearing the PAD computer 100. In this embodiment, the four shockproof elements 16 are four rubber balls, and each rubber ball 16 is formed with a hole 161 for receiving a corner of the PAD computer 100. The four shockproof elements 16 can provide a shockproof function for the PAD computer 100.

Figure 4:
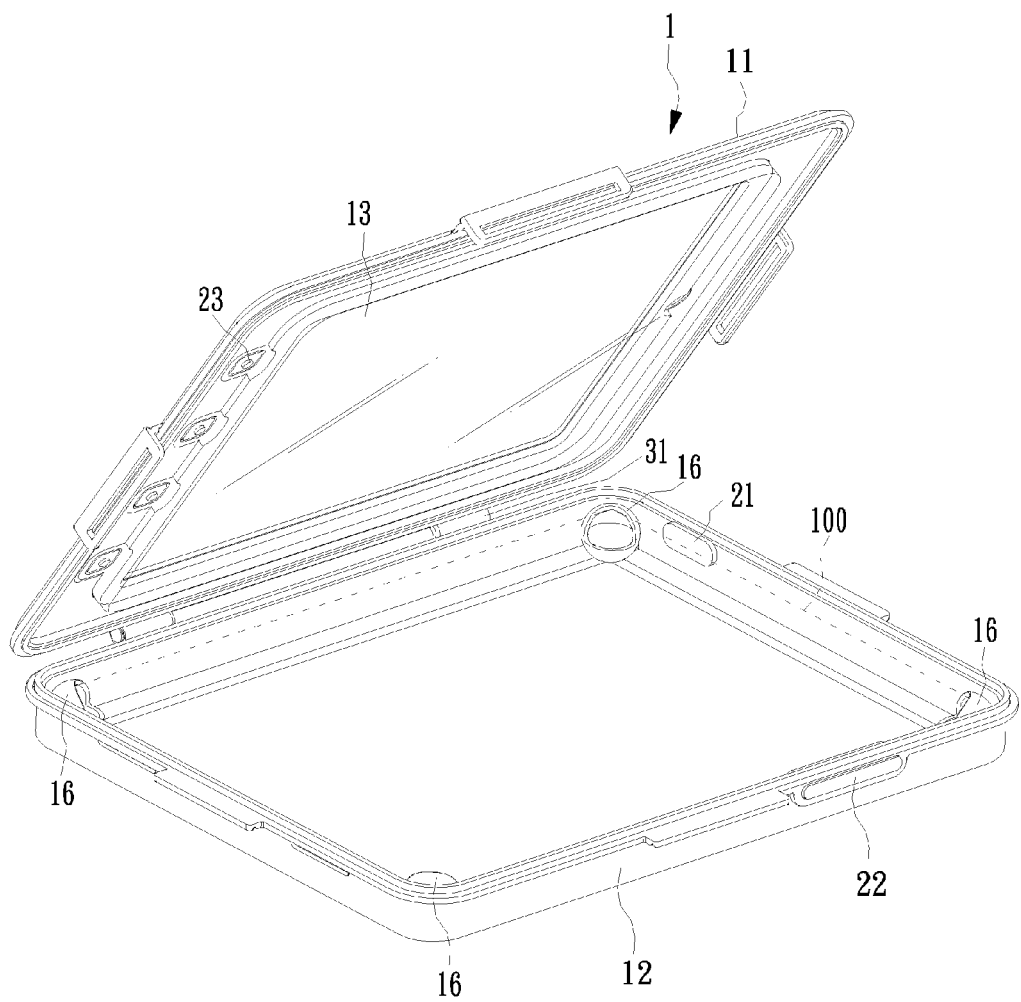
FIG. 4 is a state of using of the waterproof and shockproof cover according to FIG. 1.

Please see FIG. 4. In this embodiment, the upper housing 11 and the base housing 12 are hinged by an adjustable hinge 31. Thus, the open-angle between the upper housing 11 and the base housing 12 can be set and fixed by the adjustable hinge 31. It will be useful for the users.

Preferably, the upper housing 11 or the base housing 12 comprises at least one press button for controlling the PAD computer 100. As shown in FIG. 4, the upper housing 11 comprises four press buttons 23 on its top surface and the base housing 12 comprises a power press button 21 and an adjustment press button 22 in order to control the PAD computer 100 without opening the upper housing 11.

As shown in FIG. 5, in a preferred embodiment, the upper housing 11 comprises a second groove 113 located corresponding to the base groove 121 of the base housing 12 (shown in FIG. 3), and the second rubber ring 15 is received into both the base groove 121 and the second groove 113. As shown in FIG. 2, when the upper housing 11 and the base housing 12 are fastening with each other, the second rubber ring 15 can provide a better waterproof function.

As shown in FIG. 5, in this embodiment, each shockproof element 17 is formed with three rubber pads 171, 172, and 173. As it can be appreciated that the rubber pads 171 and 172 can be formed into only one piece, thus it only requires at least two rubber pads.

Although the present invention has been explained in relation to its preferred embodiments, it is to be understood that many other possible modifications and variations can be made without departing from the spirit and scope of the invention as hereinafter claimed.

What is claimed is:

1. A waterproof and shockproof cover for a PAD computer comprising:
    an upper housing comprising a viewing window hole and a first groove, wherein the first groove is formed around the rim of the viewing window hole;
    a first rubber ring disposed corresponding to the first groove so as to allow the first groove to receive the first rubber ring;
    a glass covering the viewing window hole and the first rubber ring;
    a base housing comprising a base groove and a rectangular accommodation space having four corners, wherein the base housing corresponds to the upper housing, the upper housing comprises a first connection, and the base housing comprises a second connection corresponding to the first connection for fastening with each other;
    a second rubber ring corresponding to the base groove, wherein the base groove receives the second rubber ring; and
    four shockproof elements disposed respectively at the four corners of the rectangular accommodation space of the base housing for bearing the PAD computer.

2. The waterproof and shockproof cover as claimed in claim 1, wherein the upper housing comprises a second groove located corresponding to the base groove, and the second rubber ring is received into both the base groove and the second groove when the upper housing and the base housing are fastening with each other.

3. The waterproof and shockproof cover as claimed in claim 2, wherein the four shockproof elements are four rubber balls, and each rubber ball is formed with a hole for receiving a corner of the PAD computer.

4. The waterproof and shockproof cover as claimed in claim 2, wherein each shockproof element is formed with at least two rubber pads.

5. The waterproof and shockproof cover as claimed in claim 1, wherein the upper housing or the base housing comprises at least one press button for controlling the PAD computer.

6. The waterproof and shockproof cover as claimed in claim 1, wherein the four shockproof elements are four rubber balls, and each rubber ball is formed with a hole for receiving a corner of the PAD computer.

7. The waterproof and shockproof cover as claimed in claim 1, wherein each shockproof element is formed with at least two rubber pads.

* * * * *